United States Patent
Fukuda et al.

(10) Patent No.: US 6,624,876 B2
(45) Date of Patent: Sep. 23, 2003

(54) METHOD OF PRINTING CALIBRATION PATTERN AND PRINTER

(75) Inventors: Hiroshi Fukuda, Saitama (JP); Takashi Ebato, Saitama (JP)

(73) Assignee: Fuji Photo Film Co., Ltd., Kangawa (JP)

( * ) Notice: Subject to any disclaimer, the term of this patent is extended or adjusted under 35 U.S.C. 154(b) by 0 days.

(21) Appl. No.: 09/740,936

(22) Filed: Dec. 21, 2000

(65) Prior Publication Data

US 2001/0004284 A1 Jun. 21, 2001

(30) Foreign Application Priority Data

Dec. 21, 1999 (JP) .......................................... 11-363047
Aug. 22, 2000 (JP) ....................................... 2000-251434

(51) Int. Cl.$^7$ ...................... G03B 29/00; G03B 27/32; G03B 27/52; B41J 3/42
(52) U.S. Cl. ........................... 355/29; 355/32; 355/40; 400/74
(58) Field of Search ..................... 355/27–29, 38–41; 400/74; 347/19, 37

(56) References Cited

U.S. PATENT DOCUMENTS

| 5,796,414 A | * | 8/1998 | Sievert et al. | ................. 347/19 |
|---|---|---|---|---|
| 5,975,674 A | * | 11/1999 | Beauchamp et al. | ........... 347/19 |
| 5,988,907 A | * | 11/1999 | Iso | ............................... 400/637 |
| 6,196,652 B1 | * | 3/2001 | Subirada et al. | ................ 347/19 |
| 6,287,027 B1 | * | 9/2001 | Komiya et al. | ................ 400/74 |

* cited by examiner

Primary Examiner—Henry Hung Nguyen
(74) Attorney, Agent, or Firm—Sughrue Mion, PLLC

(57) ABSTRACT

A printer prints a calibration pattern on a leading end portion of a roll of recording paper when the recording paper is loaded in the printer. A cutter cuts the leading end portion off the recording sheet so as to make an end edge rectangular to side edges of the recording sheet. A photometric device measures densities of the printed calibration pattern, and a system controller derives correction values for correcting density or color from the measured densities. After the calibration process, an image is printed in an image recording area on the recording paper following the leading end portion. For a printer that prints an image on a cut sheet recording paper, a calibration pattern is printed on a margin outside an image recording area. After densities of the calibration pattern are measured, the margin with the calibration pattern is cut off the recording paper.

9 Claims, 12 Drawing Sheets

W: PAPER WIDTHWISE DIRECTION

METHOD OF PRINTING CALIBRATION PATTERN AND PRINTER

BACKGROUND OF THE INVENTION

1. Field of the Invention

The present invention relates to a method of printing a calibration pattern for use in calibrating a printer, and also to a printer having a function to print a calibration pattern.

2. Background Arts

In a thermosensitive color printer, thermosensitive color recording paper, hereinafter called simply the recording paper, is directly headed by a thermal head. The recording paper has thermosensitive coloring layers formed atop another, for developing a different color from each other. The coloring layers have different heat-sensitivities from each other that decrease with the depth or distance of the respective layers from an obverse surface of the recording layer. Because of the difference in heat-sensitivity between the three coloring layers, it is possible to record three color frames sequentially from the most sensitive coloring layer to the least sensitive coloring layer by applying increasing amounts of heat energy ($mJ/mm^2$) to the recording paper from one color after another. The coloring layer having a color frame recorded thereon is fixed by electromagnetic rays of a specific range before recording the next color frame, so the already colored layer is stopped from being colored unnecessarily by the heat energy applied for the next color.

Because the sensitivities of the respective coloring layers and the heat energies applied from the thermal head vary unexpectedly depending upon production tolerances, environmental conditions, such as temperature and humidity, and aging of the printer, variations in color balance and gradation of printed image are inevitable in the thermosensitive color printer. To achieve a high fidelity, it is desirable to calibrate the printer before printing as frequently as possible.

For calibration, a calibration pattern consisting of yellow (Y), magenta (M) and cyan (C) segments or that having a gray segment in addition to these three color segments is printed to produce a test print. Then, densities of the respective segments of the test print are measured by a densitometer. On the basis of deviations of the measured densities from reference values, correction values are calculated, and are used for correcting color balance or density of the printer so as to compensate for the deviations.

However, since the conventional calibration method needs to select a calibration mode and make special and labor-consuming operations, or requires specific skills, it has been difficult to perform calibration regularly in terms of cost and time-efficiency.

Furthermore, since the test print wastes the recording paper, frequent calibrations would result in increasing the waste of recording paper.

SUMMARY OF THE INVENTION

In view of the foregoing, an object of the present invention is to provide a method of printing a calibration pattern that makes it possible to perform calibrations regularly with high efficiency while reducing waste of recording paper.

Another object of the present invention is to provide a printer that can print a calibration pattern according to the method of the present invention.

According to the present invention, for a printer that prints an image in an image recording area on a recording paper, a calibration pattern printing method comprises the steps of: printing a calibration pattern in a marginal area on the recording paper outside the image recording area; and cutting the marginal area with the calibration pattern off the recording paper after the image is printed in the image recording area.

For a printer that is loaded with a roll of recording paper, a calibration pattern printing method according to the present invention comprises the steps of: printing a calibration pattern on a leading end portion of the recording paper; and cutting the leading end with the calibration pattern off the recording paper.

Since the calibration pattern is printed on a leading end portion or a margin that is to be cut off regardless of whether the calibration pattern is printed thereon or not, the waste of recording paper is not increased by printing the calibration pattern. Also, it becomes possible to design the printer to print and measure the calibration pattern automatically at predetermined timings.

Where a plurality of the image recording areas are provided in predetermined positions on the recording paper, it is preferable that the method of the present invention further comprises the following steps: detecting a leading end edge of the recording paper as being conveyed through the printer; detecting the positions of the image recording areas; determining a first preliminary cutting position for cutting off the leading end portion on the basis of the position of a nearest one of the image recording areas to the leading end edge; comparing a length from the leading end edge to the first preliminary cutting position with a reference value that is defined by a requisite printing area for the calibration pattern; and cutting the leading end portion, if the length is less than the reference value, at a second preliminary cutting position that is farther from the leading end edge by one image recording area than the first preliminary cutting position.

A printer of the present invention, that prints an image in an image recording area on a recording paper with at least a margin outside the image recording area, comprises: a device for supplying a printing head with data for printing a calibration pattern on the margin; and a device for cutting the margin off the recording paper after the calibration pattern is printed on the margin.

According to another aspect of the present invention, a printer for use with a roll of recording paper comprises: a sensor for detecting a leading end edge of the recording paper as being conveyed through the printer; a cutter for cutting off a leading end portion of the recording paper before an image is printed on the recording paper, and for cutting the recording paper into a piece with the image printed thereon; and a device for driving a printing head of the printer to print a calibration pattern on the leading end portion after the sensor detects the leading end edge before the cutter cuts off the leading end portion.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
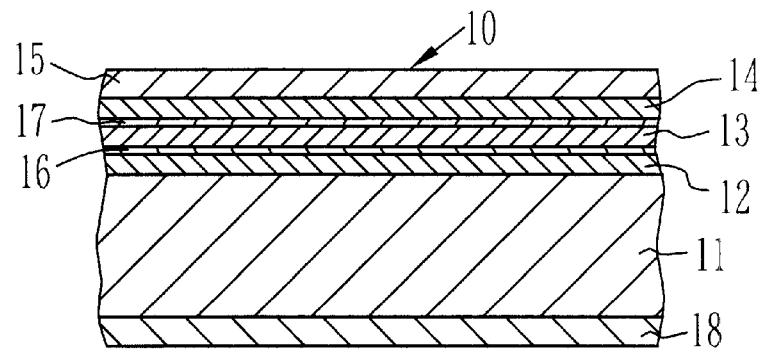
FIG. 1 is an explanatory diagram illustrating a thermosensitive color recording paper.

As shown in FIG. 1, a thermosensitive recording paper 10, hereinafter simply called the recording paper 10, has a thermosensitive cyan coloring layer 12, a thermosensitive magenta coloring layer 13, and a thermosensitive yellow coloring layer 14 formed atop another on one side of a base material 11. A transparent protective layer 15 is formed on an obverse of the recording paper 10, for protecting the coloring layers 12 to 14 from scratches or stains. The protective layer 15 is made from a transparent heat resistant resin material containing PVA (poly-vinyl-alcohol) as the main component. The three coloring layers 12 to 14 have different heat-sensitivities from each other that decrease with the depth or distance of the respective layers from the obverse of the recording layer 10. Intermediate layers 16 and 17 are formed between these three coloring layers 12 to 14, for adjusting the heat-sensitivities of the respective coloring layers 12 to 14. A back protective layer 18 is formed on the opposite side of the base material 11 from the obverse protective layer 15. The sequence of forming these three coloring layers 12 to 14 is not limited to that shown in the drawings.

In the recording paper 10 shown in FIG. 1, the cyan coloring layer 12 has the lowest heat-sensitivity and the yellow coloring layer 14 has the highest heat-sensitivity. Accordingly, the yellow coloring layer 14 needs the smallest heat energy to develop yellow color, whereas the cyan coloring layer 12 needs the largest heat energy to develop cyan color. The magenta coloring layer 13 has an absorption spectrum whose peak wavelength is at about 365 nm, and loses coloring ability when it is exposed to ultraviolet rays of this wavelength range. On the other hand, the yellow coloring layer 14 has an absorption spectrum whose peak wavelength is at about 420 nm, and loses coloring ability when it is exposed to violet visible light of this wavelength range. So the violet visible light of 420 nm is projected onto the recording paper 10 after the yellow frame is recorded, before the magenta frame is recorded. After recording the magenta frame, the ultraviolet rays of 365 nm is projected onto the recording paper 10 to fix the magenta coloring layer 13.

Figure 2:
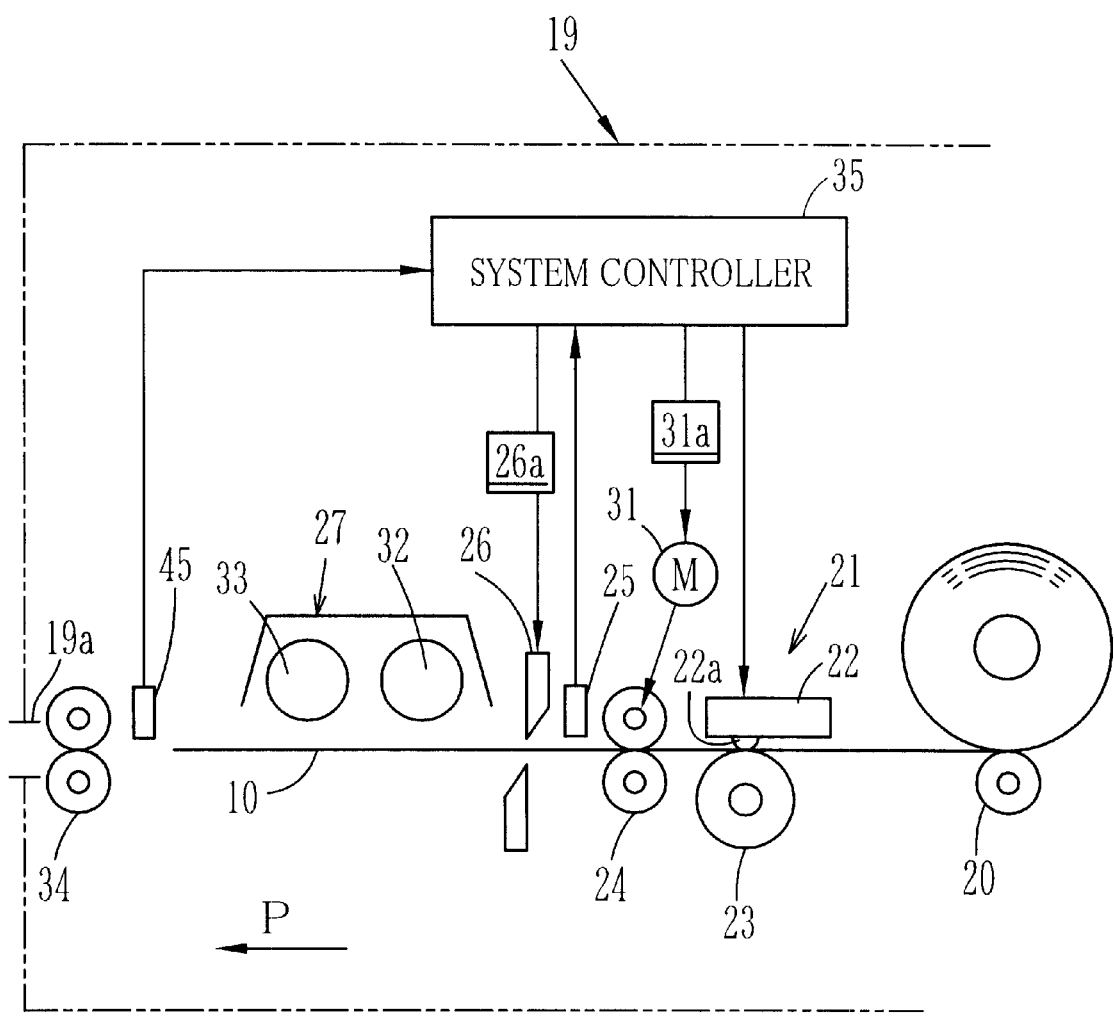
FIG. 2 is a schematic diagram illustrating a thermosensitive color printer according to a first embodiment of the present invention.

In FIG. 2, a roll of recording paper 10 having the same structure as shown in FIG. 1 is loaded in a thermosensitive color printer 19, hereinafter called simply the printer 19. The recording paper 10 is fed to a printing stage 21 by a pair of paper supply rollers 20. In the printing stage 21, there are disposed a thermal head 22, a platen roller 23, a pair of feed rollers 24, a leading end sensor 25, a paper cutter 26 and an optical fixing device 27 in this order from the paper supply roller pair 20. The thermal head 22 is provided with a heating element array 22a that is constituted of a large number of heating elements arranged in a line across a width of the recording paper 10. The platen roller 23 supports the recording paper 10 from the back side, while the heating element array 22a is pressed onto the obverse surface 10a of the recording paper 10.

The feed roller pair 24 is driven by a pulse motor 31 that is controlled by a system controller 35 through a driver 31a. The number of motor drive pulses applied to the pulse motor 31 is counted by a not-shown pulse counter that is included in the system controller 35, so the system controller 35 determines the position of the recording paper 10 based on the count. The pulse counter counts up the motor drive pulses while the pulse motor 31 rotates forward to transport the recording paper 10 in a printing direction P, and counts down the motor drive pulses while the pulse motor 31 rotates reversely.

The leading end sensor 25 is provided for detecting a leading end edge of the recording paper 10, and outputs a detection signal to the system controller 35. The leading end sensor 25 may be of a photo-interruption type or any other type. Upon the detection signal from the leading end sensor 25, the pulse counter starts counting the drive pulses. Instead of counting the drive pulses, it is possible to provide a pulse encoder in connection with the recording paper 10, and count the number of pulses generated from the pulse encoder.

The heating elements 22a of the thermal head 22 are driven in synchronism with the transport of the recording paper 10 in the printing direction P, to apply heat energy to the recording paper 10 for recording full-color image in a three color frame sequential fashion. The optical fixing device 27 consists of a yellow fixing lamp 32 and magenta fixing lamp 33. The yellow fixing lamp 32 emits violet visible light having an emission peak at 420 nm after a yellow frame is recorded on the yellow coloring layer 14. The magenta fixing lamp 33 emits ultraviolet rays having an emission peak at 365 nm after a magenta frame is recorded on the magenta coloring layer 13.

Thus, the yellow frame is thermally recorded and optically fixed on the yellow coloring layer 14 while the recording paper 10 makes a first reciprocation through the printing stage 21, and the magenta frame is thermally recorded and optically fixed on the magenta coloring layer 13 while the recording paper 10 makes a second reciprocation. Thereafter while the recording paper makes a third reciprocation, a cyan frame is thermally recorded on the cyan coloring layer 12.

Figure 4:
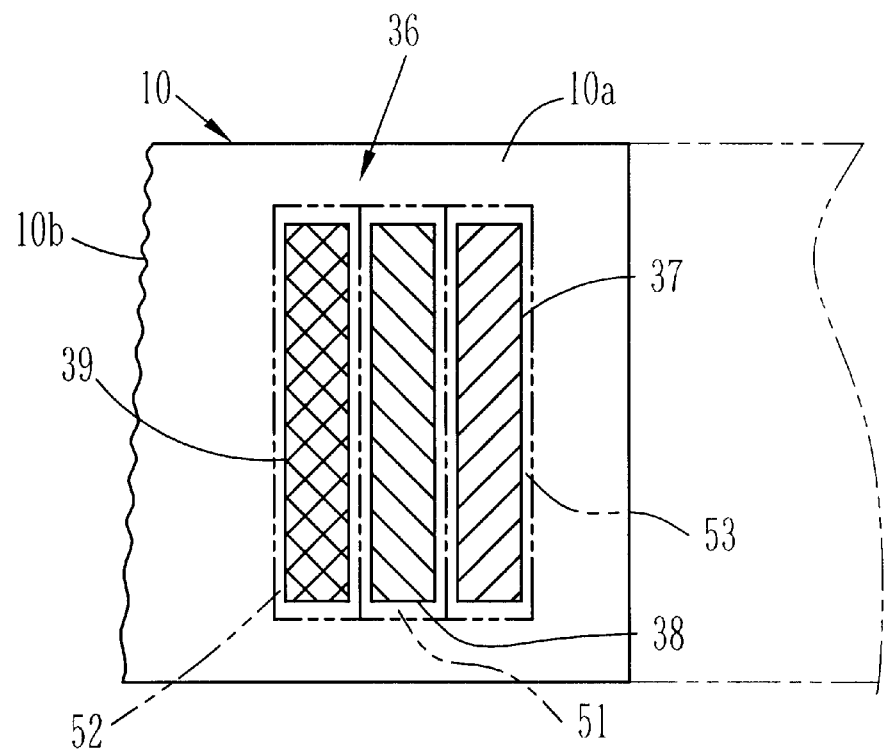
FIG. 4 is an explanatory diagram illustrating a calibration pattern.

The paper cutter 26 is driven by the system controller 35 through a cutter driver 26a to cut the image recording area having the full-color image recorded thereon off the recording paper 10. The cut sheet of the recording paper 10 is ejected out of the printer 19 by a pair of ejection rollers 34 through a paper exit 10a. The paper cutter 26 is also used for cutting a leading end portion 10a of a newly loaded roll of recording paper 10 along a line rectangular to side edges of the recording paper 10. This is because an end edge 10b of the leading end portion 10a of the newly loaded recording paper 10 is not always rectangular to its side edges. According to the present embodiment, a calibration pattern 36 consisting of a yellow segment 37, a magenta segment 38 and a cyan segment 39, as shown in FIG. 4, is printed on the leading end portion 10a that is to be cut off and thrown away. Accordingly, printing the calibration pattern 36 on the recording paper 10 little increases the waste of recording paper 10. The position of each line along which the recording paper 10 is cut is determined by the system controller 35 with reference to the count of the pulse counter.

A photometric sensor 45 is disposed inside the printer 19 in the vicinity of the paper exit 19a, for measuring respective densities of the yellow, magenta and cyan segments 37 to 39 of the calibration pattern 36 printed on the leading end portion 10a. The photometric sensor 45 includes three color filters for measuring the three color densities. The photometric sensor 45 is also connected to the system controller 45. The system controller 35 logarithmically converts the three color densities measured through the photometric sensor 45 into density data.

Figure 3:
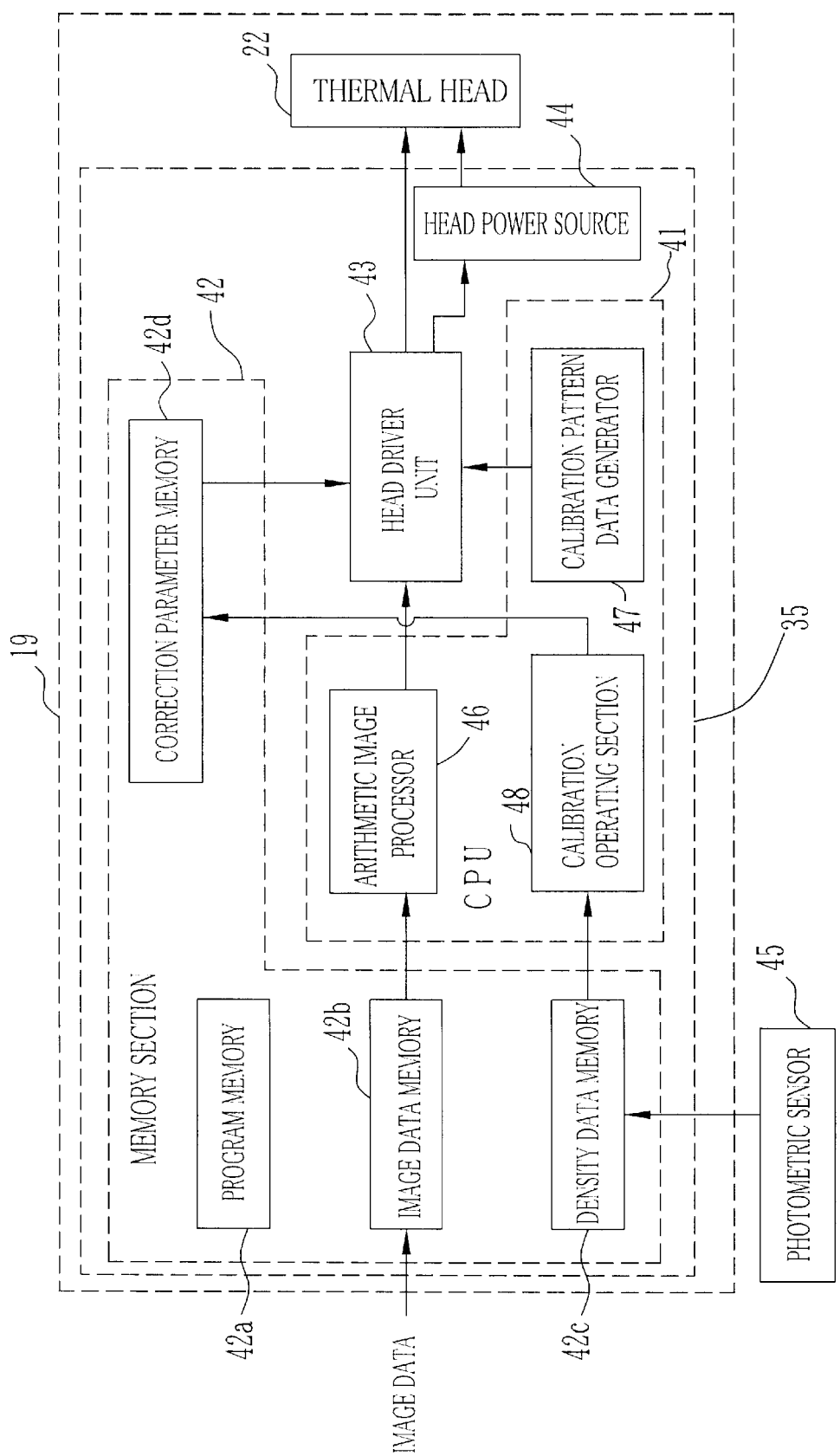
FIG. 3 is a block diagram of the thermosensitive color printer of the first embodiment.

The system controller 35 is a well-known microcomputer. As shown in FIG. 3, the system controller 35 includes CPU 41, a memory section 42, a head driver unit 43 and a head power source section 44 as main components. The memory section 42 is provided with a plurality of memory locations, including a program memory 42a storing programs for many kinds of processing, an image data memory 42b, a density data memory 42c for storing the density data, and a correction parameter memory 42d.

The CPU 41 includes an arithmetic image processor 46, a calibration pattern data generator 47 and a calibration operating section 48. The arithmetic image processor 46 corrects color balance and gradation of image data from the image data memory 42b, so that an image recorded on the recording paper 10 has proper densities, colors and gradations. The corrected image data is sent to the head driver unit 43 one line after another. The head driver unit 43 drives the heating elements 22 of the thermal head 22 in accordance with the image data.

Figure 5A:
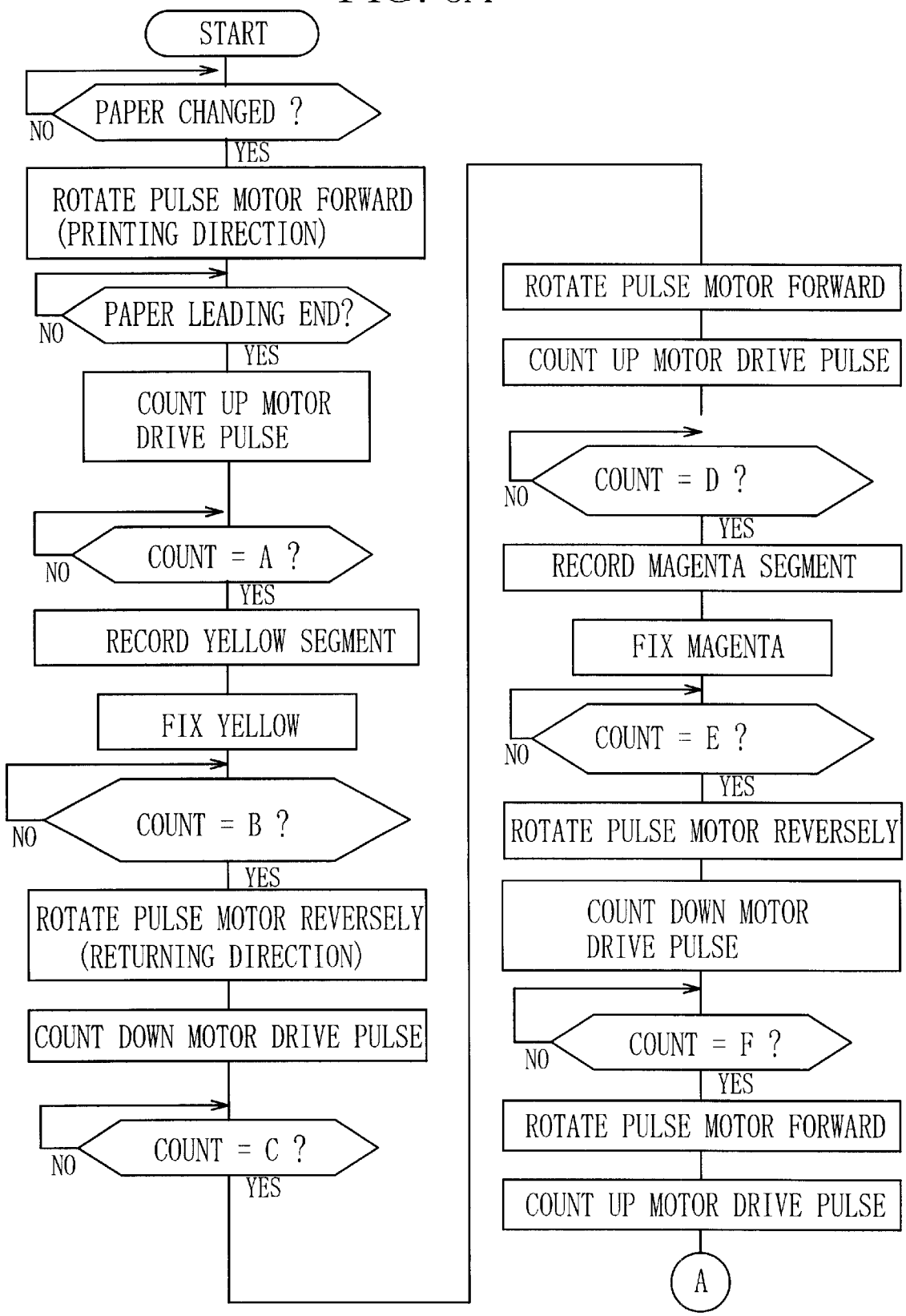
FIGS. 5A and 5B show a flowchart illustrating an operation sequence for printing the calibration pattern of FIG. 4.
Figure 5B:
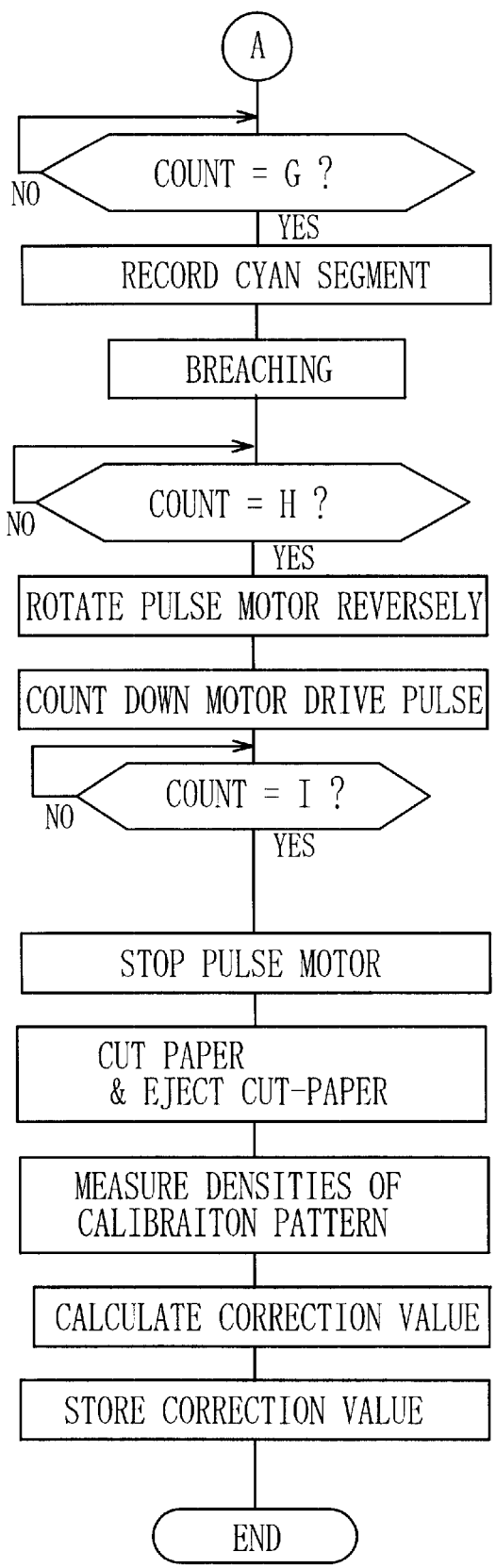

The calibration pattern data generator 47 generates printing data for printing the calibration pattern 36 and sends the printing data to the head driver unit 43 immediately after the recording paper 10 is newly loaded, so that the calibration pattern 36 is printed on the leading end portion 10a of the recording paper 10 before the leading end portion 10a is cut off. The CPU 41 performs a calibration process according the sequence shown in FIGS. 5A and 5B. When the printer 19 is turned on, the CPU 41 first checks if the recording paper 10 is newly loaded or not. If the printer 19 is powered for the first time after the recording paper 10 is newly loaded, the CPU 41 automatically starts the calibration process. In other cases, the printer 19 is set to an ordinary print mode.

In the calibration process, the pulse motor 31 is rotated forward through the driver 31a to feed the recording paper 10 in the printing direction P through the feed roller pair 24. After a leading end edge 10b of the newly loaded recording paper 10 is detected by the leading end sensor 25, the system controller 35 starts counting up the motor drive pulses applied to the pulse motor 31.

When the count comes to a predetermined value "A", the heating element array 22a is driven to record the yellow segment 37. While the yellow segment 37 is recorded, the yellow fixing lamp 32 is turned on. The recording paper 10 is transported further in the printing direction P after the yellow segment 37 is recorded, so as to fix the yellow coloring layer 14 on a leading side of the yellow segment 37 with respect to the printing direction P.

When the count comes to a second value "B", the system controller 35 stops rotating the pulse motor 31 in the forward direction, and starts rotating it reversely to transport the recording paper 10 in reverse to the printing direction P. Then, the pulse counter of the system controller 35 counts down the motor drive pulses to the pulse motor 31. When the count comes to a predetermined value "C", the system controller 35 starts rotating the pulse motor 31 in the forward direction to feed the recording paper 10 in the printing direction P again. When the count reaches a value "D", the magenta segment 38 starts being recorded on the leading side of the yellow segment 37, and the magenta fixing lamp 33 is turned on. After the magenta segment recording, the recording paper 10 is transported further in the printing direction P to fix the magenta coloring layer 13 on the leading side of the magenta segment 38.

Since the yellow coloring layer 14 is already fixed on the leading side of the yellow segment 37, any yellow dots would not be recorded in the magenta segment 38. When the drive pulses are counted down to a value "E", the recording paper 10 starts being transported in the reverse direction till the count reaches a value "F". Thereafter, the recording paper 10 is transported in the printing direction P. When the drive pulses are counted up to a value "G", the cyan segment 39 starts being recorded on the leading side of the magenta segment 38. Since the magenta coloring layer 13 as well as the yellow coloring layer 14 are fixed on the leading side of the magenta segment 38, only cyan dots are recorded in the cyan segment 39.

Although the cyan coloring layer 12 does not need to be optically fixed, the magenta fixing lamp 33 is turned on during the cyan segment recording, to bleach those parts of the recording paper 10 having no color developed or no image recorded thereon. When the count reaches a value "H" as a result of up-counting, the recording paper 10 starts being fed in the reverse direction till the count reaches a value "I" as a result of down-counting. In this position, a cutting line for cutting the leading end portion 10a off the recording sheet 10 is located at the paper cutter 26. So the paper cutter 26 is activated to cut the leading end portion 10a, providing a sheet of test print. While the test print is transported toward the paper exit 19a, the photometric sensor 45 measures densities of the cyan, magenta and yellow segments 39, 38 and 37 of the test print.

The calibration operating section 48 calculates differences of the density data from reference densities for three colors, and calculates density correction amounts on the basis of the calculated differences. From these density correction amounts, the calibration operating section 48 determines voltage levels to be applied to the thermal head 22 for recording the respective colors. The corrected voltage levels are stored in the correction parameter memory 42*d*, so that the thermal head 22 is driven for recording a full-color image on the basis of the corrected voltage levels through the head power source section 44. The density correction amounts are previously correlated to the voltage levels by experiments. It is possible to correct power conduction times through the heating elements 22*a* or the image data itself instead of or in addition to correcting the voltage level.

Although the yellow, magenta and cyan segments 37 to 39 of the calibration pattern 39 are recorded in the three-color frame sequential fashion in the same way as for full-color images to print, it is possible to previously provide the leading end portion 10*a* of a new roll of recording paper 10 with a yellow fixed area 51 where the yellow coloring layer 14 is optically fixed and a yellow and magenta fixed area 52 where the yellow and magenta coloring layers 14 and 13 are optically fixed, as shown by phantom lines in FIG. 4. By recording the magenta segment 38 and the cyan segment 39 respectively on the yellow fixed area 51 and the yellow and magenta fixed area 51, it becomes unnecessary to make optical fixing processes for printing the calibration pattern, so the calibration pattern 36 may be printed in a shorter time. In that case, the yellow segment 37 is recorded on an optically unfixed area 53 adjacent to the yellow fixed area 51. These optically fixed areas 51 and 52 may be provided during the manufacture of the recording paper 10.

Figure 6A:
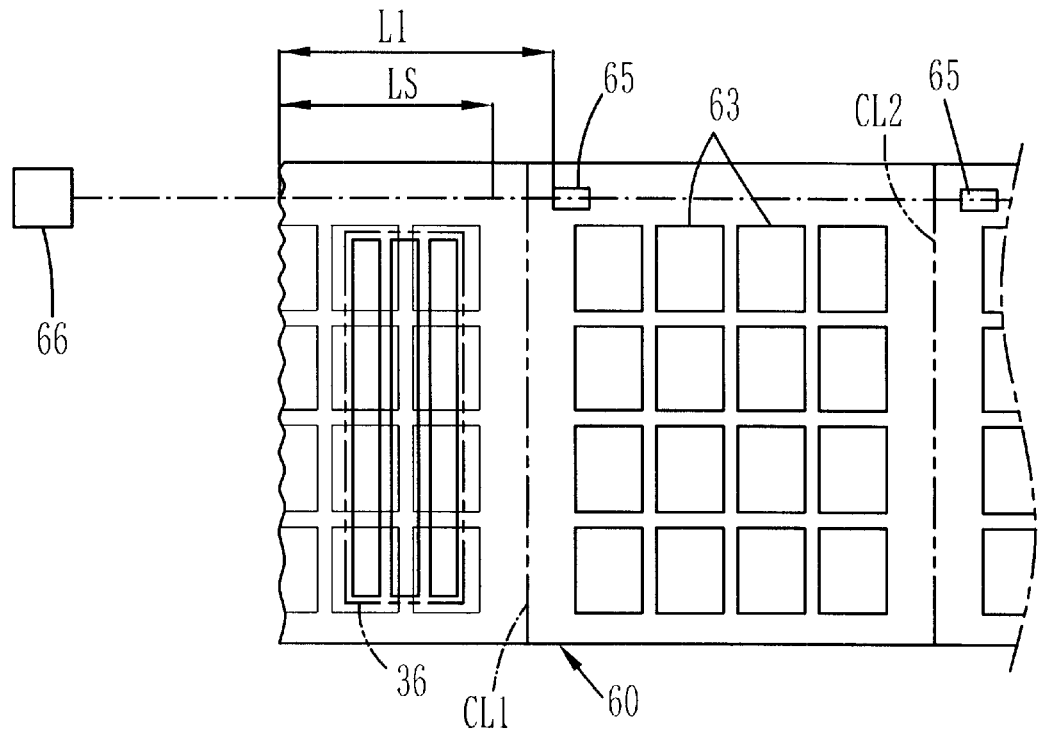
FIGS. 6A and 6B are explanatory diagrams illustrating an embodiment of calibration pattern printing method of the present invention.

Although the above embodiment uses an ordinary type of recording paper 10, the present invention is applicable for use with a special recording paper for stickers, hereinafter called the sticker paper. As well-known in the art, the sticker paper has an adhesive layer on a back surface of a recording paper, and a release backing sheet is provided on the adhesive layer. As shown in FIG. 6A, the recording paper of the sticker paper 60 is previously nicked to form a plurality of matrixes of sticker chips 63. In the shown example, each matrix consists of 4×4 chips 63. Also a positioning mark 65 is provided on a leading corner of each matrix of sticker chips 63.

The positioning mark 65 is detected by a mark sensor 66. On the basis of a detection signal from the mark sensor 66 and a detection signal from a leading end sensor, the sticker paper 60 is positioned relative to a printing head such that a matrix of compressed or reduced images are printed on the respective sticker chips 63 of one matrix. Thereafter, the sticker paper 60 is cut into a predetermined length containing the matrix of printed sticker chips 63. For this purposed, cutting lines CL1 and CL2 are determined with reference to the positioning marks 65.

When printing a calibration pattern 67 on the sticker paper 60, a distance or length L1 from a leading end edge of the sticker paper 60 to a first one of the positioning marks 65 that is nearest to the leading end edge is detected. The length L1 is compared to a requisite length LS from the leading end edge of the sticker paper 60 that is necessary for the calibration pattern 67. If the length L1 is more than the length LS, the sticker paper 60 is cut along the first cutting line CL1 that is determined by the first positioning mark 65, after the calibration pattern 67 is printed on a leading end portion of the sticker paper 60. Since the calibration pattern 67 is printed on the leading end portion that is to be preliminary cut off, the waste of the sticker paper 60 is not increased by printing the calibration pattern 67.

Figure 6B:
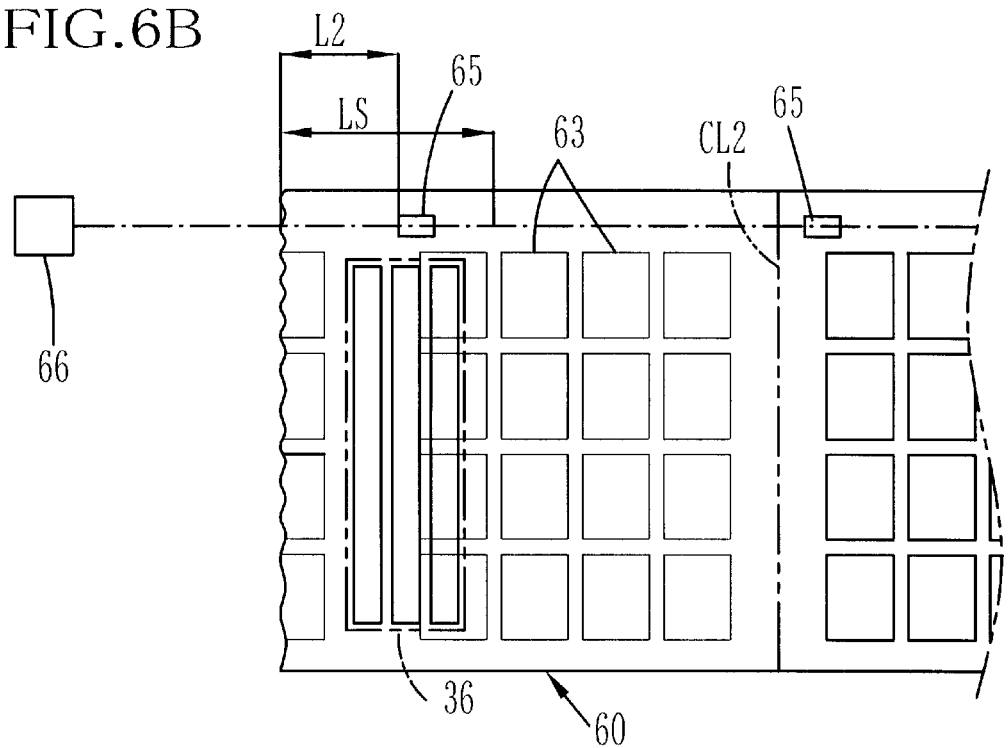

If the first positioning mark 65 is at a distance L2 from the leading end edge of the sticker paper 60 that is less than the requisite length LS for printing the calibration pattern 67, as shown in FIG. 6B, the sticker paper 60 is cut along the second cutting line CL2 that is determined by the second positioning mark 65 next to the first positioning mark 65, after the calibration pattern 67 is printed. Therefore, the calibration pattern 67 is printed with no problem in this case.

Figure 7:
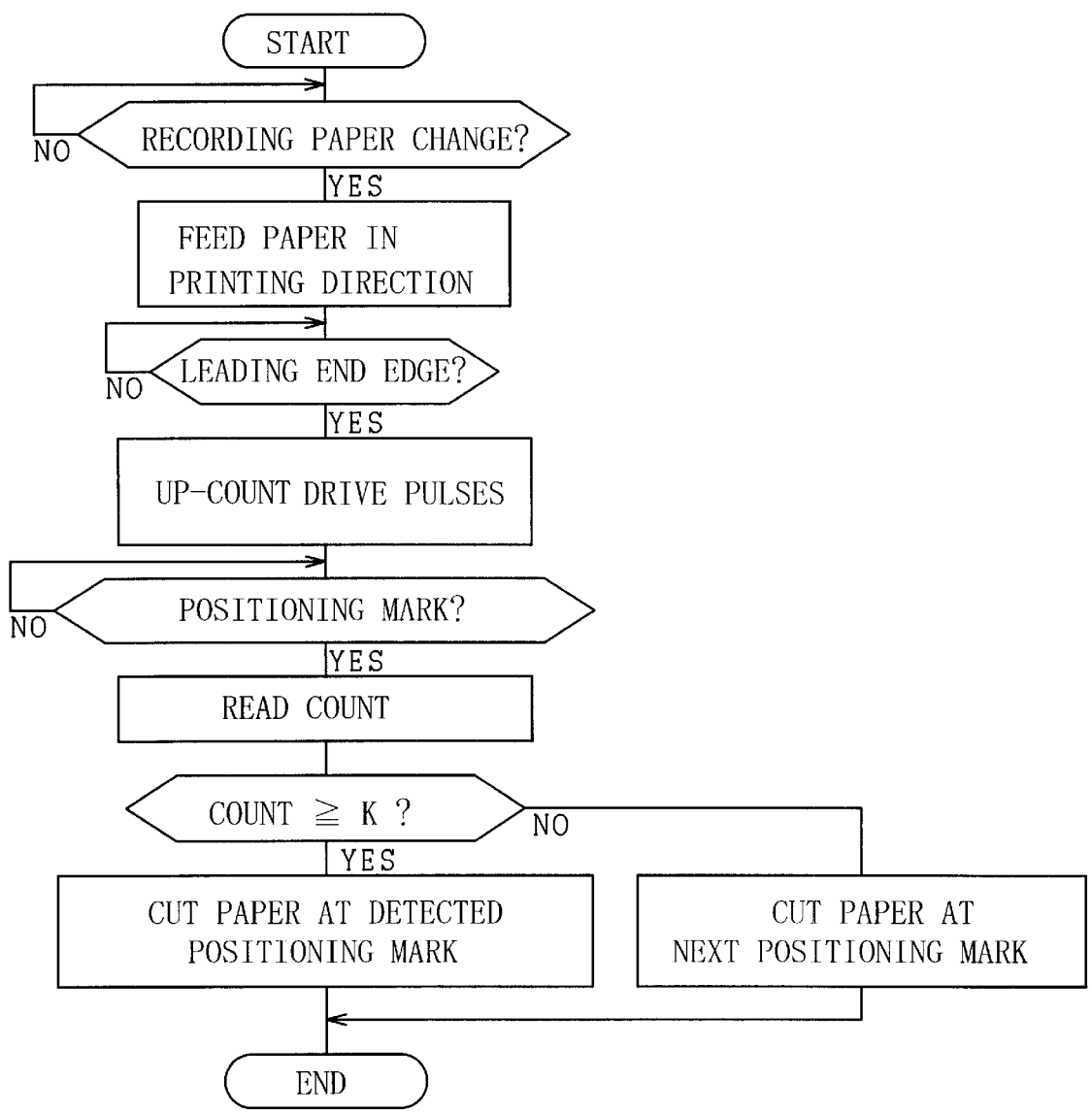
FIG. 7 is a flowchart illustrating a cutting position determining process of the calibration printing method of FIGS. 6A and 6B.

As shown in FIG. 7 showing an operation sequence for determining a preliminary cutting position for the sticker paper 60, the length from the leading end edge of the sticker paper 60 to the first positioning mark 65 may be determined by counting drive pulses applied to a motor for conveying the sticker paper 60 or encoder pulses generated in connection to the conveying operation of the sticker paper 60. In the flowchart of FIG. 7, a comparative count K corresponds to the requisite length LS.

The calibration process may be executed not only immediately after a new roll of recording paper 10 is loaded, but also when the recording paper 10 is reloaded, for example, after some troubles, like jamming. Also in that case, the calibration pattern 36 is printed on a leading end of the reloaded recording paper 10, and is cut into a piece of test print in the same way as set forth above. It is also possible to execute the calibration process immediately after each time a power switch of the printer is turned on, or when a predetermined number of images have been printed since the last calibration process, or when a predetermined time has elapsed since the power switch is turned on, or at any other predetermined intervals. It is of course possible to execute the calibration process in response to a command entered by the operator of the printer.

Figure 8:
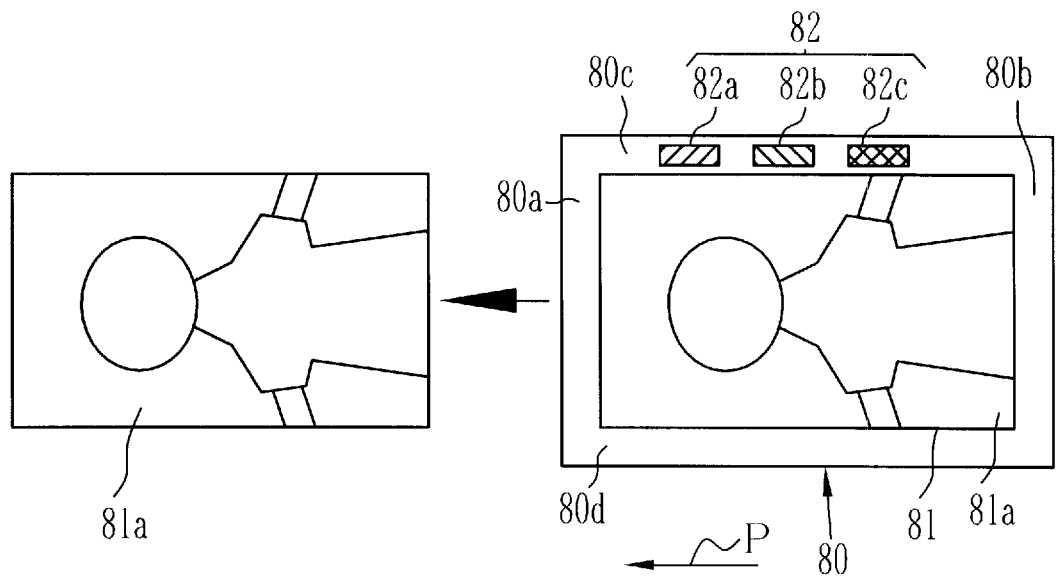
FIG. 8 is an explanatory diagram illustrating a second embodiment of calibration printing method of the present invention.

The present invention is also applicable to those printers which uses cut sheets of recording paper instead of the continuous web of recording paper withdrawn from a paper roll. In that case, an image recording area 81 is defined to be smaller than a cut sheet paper 80, as shown in FIG. 8A, and a calibration pattern 82 is recorded on one of four margins 80*a*, 80*b*, 80*c* and 80*d* around the image recording area 81. In the embodiment shown in FIG. 8A, the calibration pattern 82 is printed on one side margin 80*c* that extends in a printing direction P, and the calibration pattern 82 consists of three color segments 82*a*, 82*b* and 82*c* arranged along the printing direction P. After an image 81*a* is printed on the image recording area 81, the margins 80*a* to 80*d* are cut off, as shown in FIG. 8B. Thus, the waste of paper is reduced to the minimum.

Figure 9:
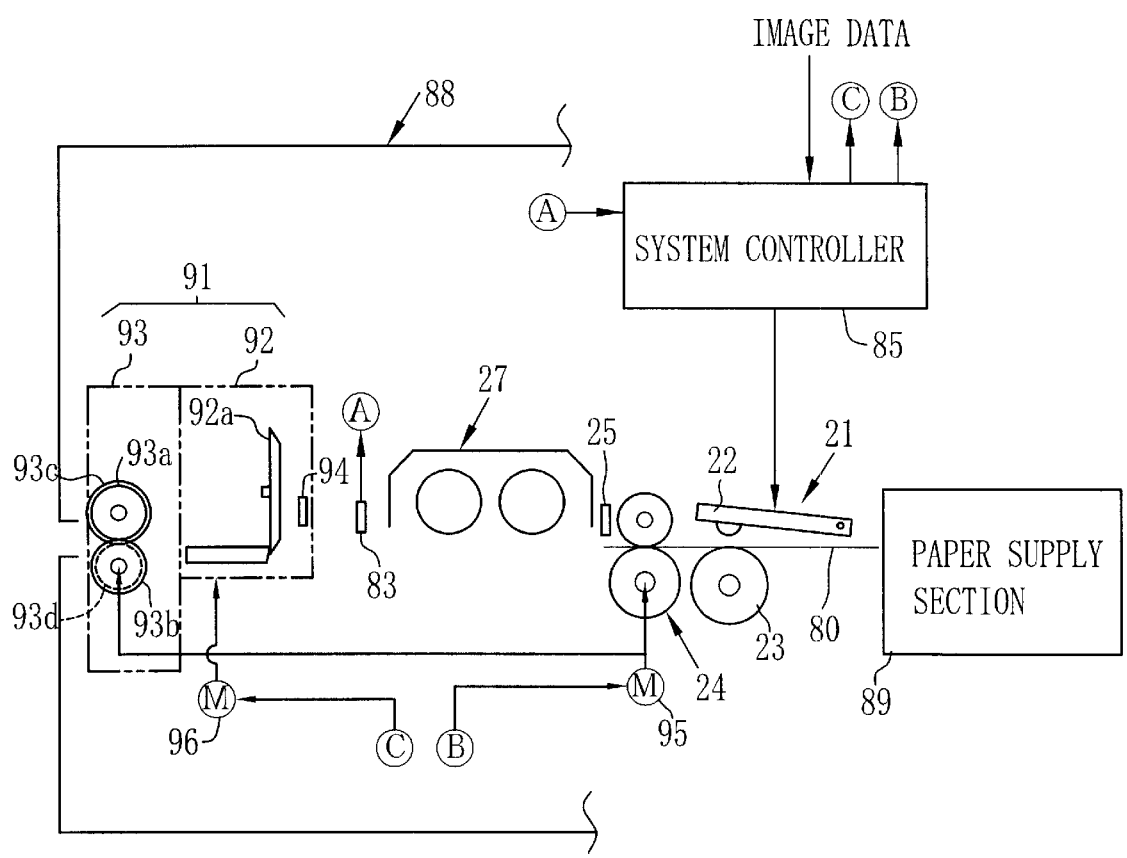
FIG. 9 is a schematic diagram illustrating a thermosensitive color printer that has a function to print a calibration pattern according to the method of the second embodiment.

FIG. 9 shows an embodiment of a printer 88 for use with a cut sheet paper 80, and has a function to print a calibration pattern on one margin of the cut sheet paper 80. A paper supply section 89 holds a plurality of sheets of cut sheet papers 80, and feeds out the cut sheet paper 80 one after another to a printing stage 21. In the printing stage 21, a thermal head 22, a platen roller 23, a pair of feed rollers 24, a leading end sensor 25, an optical fixing device 27, a photometric unit 83 and a cutter unit 91 are disposed in this order from the paper supply section 89.

Figure 10:
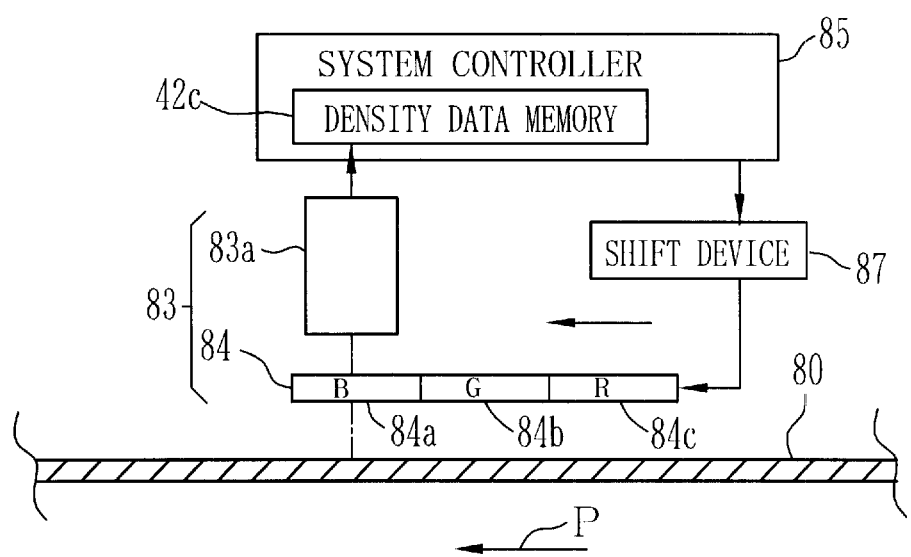
FIG. 10 is a schematic diagram illustrating a photometric unit provided in the thermosensitive color printer of FIG. 9.

As shown in FIG. 10, the photometric unit 83 is constituted of a photo sensor 83*a* and a color filter 84. The color filter 84 consists of a blue-pass filter segment 84*a*, a green-pass filter segment 84*b* and a red-pass filter segment 84*c* which are arranged along the printing direction P. One of the filter segments 84*a* to 84*c* is placed in an optical path of the photo sensor 83*a* by means of a shift device 87 under the control of a system controller 85. Specifically, the blue-pass filter segment 84*a* is placed in the optical path to measure density of the yellow segment 82*a* of the calibration pattern 82, and the green-pass filter segment 84*b* is placed in the optical path to measure density of the magenta segment 82*b*, whereas the red-pass filter segment 84*c* is for measuring density of the cyan segment 82*c*. The system controller 85 picks up photo-electric signal from the photo sensor 83*a*, converts it into density data and writes the density data in a density data memory 42*c*.

The cutter unit 91 consists of a lateral margin cutter 92 and a side margin cutter 93. The lateral margin cutter 92 cuts the leading margin 80*a* and the trailing margin 80*b* while moving a rotary cutting disc 92*a* in a lateral direction of the cut sheet paper 80 that is perpendicular to the paper feeding direction or printing direction P. The rotary cutting disc 92*a* is driven by a motor 96 under the control of the system controller 85. An end edge sensor 94 is disposed before the lateral margin cutter 92 in the printing direction P, for detecting the leading end edge and the trailing end edge of the cut sheet paper 80. With reference to detection signals from the end edge sensor 94, the system controller 85 controls a feed motor 95 so as to position the leading margin 80*a* and then the trailing margin 80*b* of the cut sheet paper 80 appropriately relative to the lateral margin cutter 92.

The side margin cutter 93 consists of two pairs of rotary cutting discs 93*c* and 93*d* disposed on opposite sides of a pair of ejection rollers 93*a* and 92*b* in coaxial with the ejection rollers 93*a* and 94*b*. The cutting discs 93*c* and 93*d* are rotated together with the ejection rollers 93*a* and 93*b* by the feed motor 95, to cut the side margins 80*c* and 80*d* off the cut sheet paper 80 as it is ejected through the ejection rollers 93*a* and 93*b*.

Figure 11:
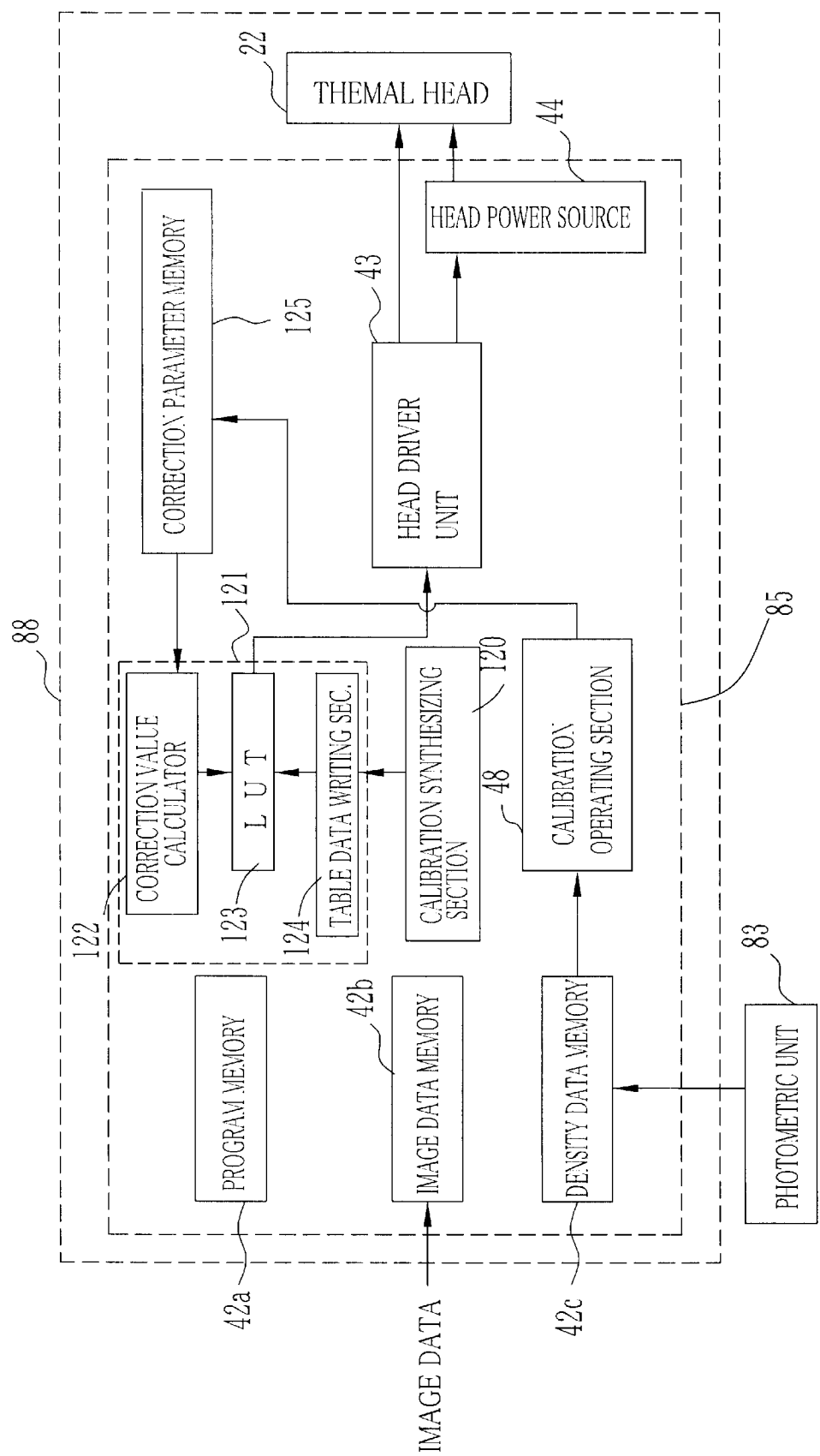
FIG. 11 is a block diagram of the thermosensitive color printer of FIG. 9.

According to the embodiment shown in FIG. 8A, the calibration pattern 82 is printed concurrently with the image 81*a* by a thermal head 22. For this purpose, the system controller 85 includes a calibration pattern synthesizing section 120 instead of a calibration pattern data generator, as shown in FIG. 11. The calibration pattern synthesizing section 120 synthesizes image data from an image data memory 42*b* with image data of the calibration pattern 82 that is previously stored therein, and outputs synthesized image data to an arithmetic image processing section 121.

The arithmetic image processing section 121 consists of a correction value calculator 122, a look-up table (LUT) 123 and a table data writing section 124. The look-up table 123 is for correcting image data on the basis of many kinds of correction parameters supplied from a correction parameter memory 125. Specifically, the correction value calculator 122 calculates correction values based on the correction parameters from the correction parameter memory 125. Then the image data is corrected with the correction values, and the table data writing section 124 writes the corrected image data in those addresses of the look-up table 123 which are allocated to individual pixels of the image data. The corrected image data is sent to a head driver unit 43, so the thermal head 22 is driven in accordance with the corrected image data.

The correction parameters may include not only correction values determined by a calibration operating section 48 based on the density data from the density data memory 42*c*, but also correction values compensating for variations in resistance between the heating elements, fluctuations in power source voltage for the thermal head 22, and variations in environmental temperature.

Although the image data is corrected in the embodiment shown in FIG. 11, it is possible to correct the voltage applied to the thermal head 22 with the correction values instead of or in addition to correcting the image data.

Figure 12:
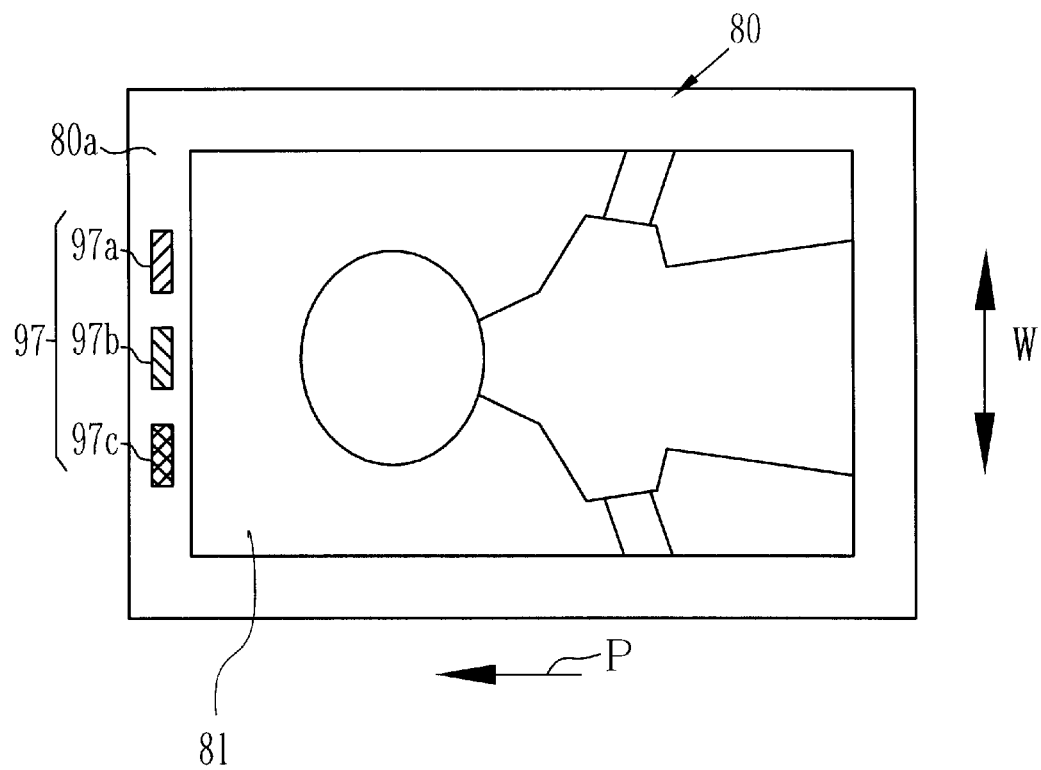
FIG. 12 is an explanatory diagram illustrating a calibration pattern printed according to a third embodiment of the present invention.

It is also possible to print a calibration pattern along the lateral margin 80*a* or 80*b* of the cut sheet paper 80. For example, as shown in FIG. 12, a calibration pattern 97 consisting of three color segments 97*a*, 97*b* and 97*c* arranged along the lateral direction is printed on the leading margin 80*a*. Since the cut sheet paper 80 is conveyed with its lengthwise direction aligned in the printing direction P in FIG. 12, the lateral direction is equal to a widthwise direction W of the cut sheet paper 80.

Figure 13:
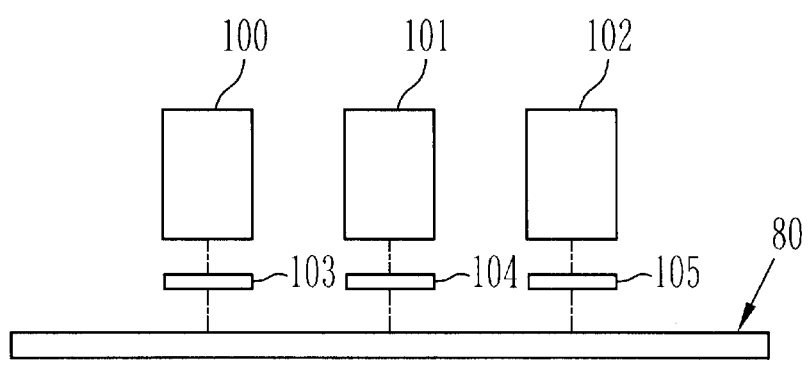
FIG. 13 is a schematic diagram illustrating a photometric unit for use in the third embodiment.

To measure densities of the three color segments 97*a* to 97*c*, a photometric unit having three photo sensors 100, 101 and 102 arranged along the widthwise direction W, as shown in FIG. 13, is used instead of the photometric unit 83. A blue-pass filter 103, a green-pass filter 104 and a red-pass filter 105 are placed in optical paths of the respective photo sensors 100 to 102, so that densities of the three color segments 97*a* to 97*c* are detected concurrently when the calibration pattern 97 is placed under these photo sensors 100 to 102. According to this embodiment, it is possible to print the calibration pattern 97 before printing the image 81, in order to correct image data of the image 81. In that case, it is possible to execute the calibration process before each printing of one image.

It is not always necessary to cut all the margins 80*a* to 80*d* around the image recording area 81. Instead, it is possible to cut off only one margin or a portion of the margin having a calibration pattern recorded thereon. In that case, it is preferable to define widths of the four margins such that the four margins have an uniform width after the portion with the calibration pattern is cut off.

Figure 14:
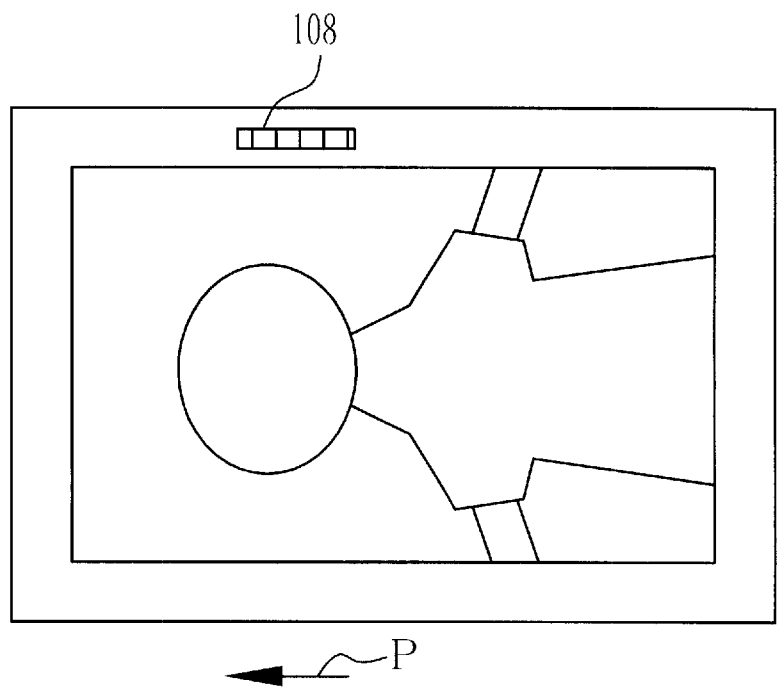
FIG. 14 is an explanatory diagram illustrating a calibration pattern printed according to a fourth embodiment of the present invention.

Although the calibration pattern 36, 82 or 97 consists of three color segments in the above embodiments, a gray scale pattern 108 may be printed for use as a calibration pattern, as shown for instance in FIG. 14, wherein the gray scale pattern 108 consists of a plurality of gray patches with gradually changing densities which are arranged along the printing direction P. In that case, three-color separation densities of each gray patch are measured by a photometric sensor, and are used for calculating correction values.

Figure 15:
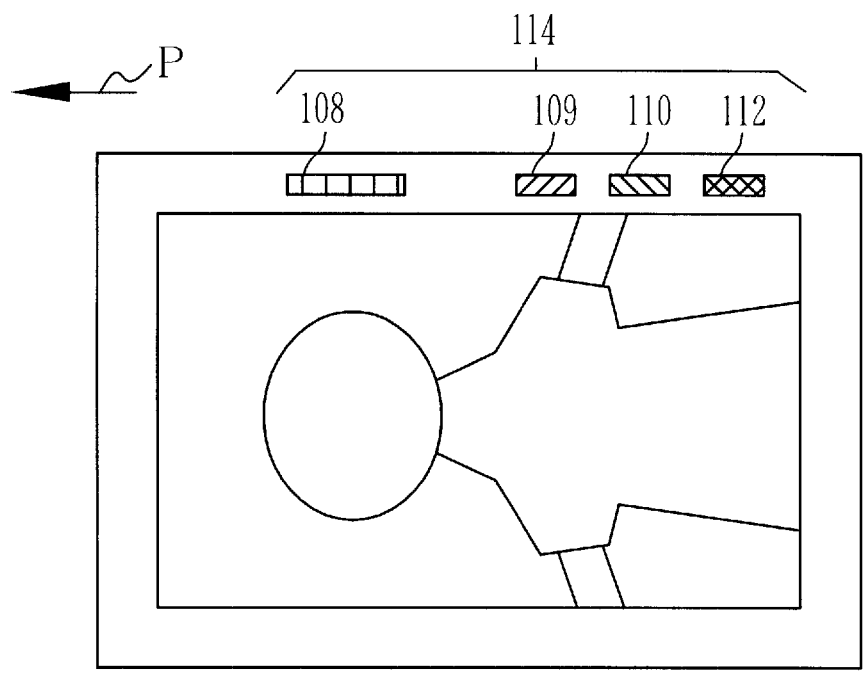
FIG. 15 is an explanatory diagram illustrating a calibration pattern printed according to a fifth embodiment of the present invention.

As shown in FIG. 15, it is also possible to print the gray scale pattern 108 in addition to three color segments 109, 110 and 112, and use them as a calibration pattern 114. Thus, the size, shape and position of the calibration pattern may be modified appropriately.

Although the photometric device for measuring densities of the calibration pattern is provided inside the printer in continuation with the printing stage in the above embodiments, it is possible to provide a printer with a slot for inserting a test print in order to measure densities of the calibration pattern after the test print is ejected from the printer. It is also possible to measure the densities of the calibration pattern by a separate densitometer that is connectable to the printer.

Although the present invention has been described with respect to those cases where the calibration process is executed on the user side, the calibration process may be executed during the manufacture of the printer. Thereby, variations in coloring densities caused by variations in many kinds of parameters relating to the thermal head, the optical fixing device and other components of the printer may be corrected without adjusting these parameters. Thus, the number of manufacturing processes may be reduced.

Although the thermosensitive color recording paper has three kinds of coloring layers, the present invention is applicable to those printers which use thermosensitive color recording paper that have more than three coloring layers.

Although the present invention has been described with respect to the capstan-driven type thermosensitive printer having a thermal head, the present invention is applicable to a platen-driven type printer where the platen roller is driven by a motor to transport the recording paper, or a color printer having three thermal head for three colors. The present invention is not limited to color thermosensitive printers, but also applicable to any kind of printers.

Thus, the present invention is not to be limited to the above embodiments but, on the contrary, various modifications may be possible to those skilled in the art without departing from the scope of claims appended hereto.

What is claimed is:

1. A calibration pattern printing method for a printer that prints an image in an image recording area on a recording paper, comprising the steps of:
    printing a calibration pattern in a marginal area on the recording paper outside said image recording area;
    cutting said marginal area with said calibration pattern off the recording paper after the image is printed in said image recording area; and
    synthesizing image data for said calibration pattern with image data for said image; and
    printing said calibration pattern concurrently with the image.

2. A calibration pattern printing method as recited in claim 1, wherein said calibration pattern comprises yellow, magenta and cyan segments.

3. A calibration pattern printing method as recited in claim 1, wherein said calibration pattern comprises a gray scale pattern.

4. The method of claim 1, wherein the marginal area outside the image recording area includes a leading end portion and an adjacent side portion, wherein the calibration pattern is printed on the adjacent side portion.

5. A calibration pattern printing method for a printer that is loaded with a roll of recording paper, the method comprising the steps of:
    printing a calibration pattern on a leading end portion of the recording paper; and
    cutting said leading end with said calibration pattern off the recording paper,
    wherein a plurality of said image recording areas are provided on the recording paper in predetermined positions, and the method further comprises the steps of:
        detecting a leading end edge of the recording paper as being conveyed through the printer;
        detecting the positions of said image recording areas;
        determining a first preliminary cutting position for cutting off said leading end portion on the basis of the position of a nearest one of said image recording areas to the leading end edge;
        comparing a length from the leading end edge to said first preliminary cutting position with a reference value that is defined by a requisite printing area for said calibration pattern; and
        cutting said leading end portion, if said length is less than said reference value, at a second preliminary cutting position that is farther from the leading edge by one image recording area than said first preliminary cutting position.

6. A printer that prints an image in an image recording area on a recording paper with at least a margin outside said image recording area, said printer comprising:
    a device for supplying a printing head with data for printing a calibration pattern on said margin;
    a device for cutting said margin off the recording paper after said calibration pattern is printed on said margin;
    a photometric device for measuring densities of said calibration pattern printed on said recording paper, before said margin is cut off; and
    a correction device for making density correction or color correction on the basis of densities measured by said photometric device;
    wherein said data supplying device comprises a device for synthesizing image data for said calibration pattern with image data for said image, so the printing head prints said calibration pattern concurrently with said image in accordance with synthesized image data.

7. A printer as recited in claim 6, wherein the printer automatically prints and measures said calibration pattern at predetermined timings.

8. The printer of claim 6, wherein the margin outside the image recording area includes a leading end portion and an adjacent side portion, wherein the calibration pattern is printed on the adjacent side portion.

9. A printer for use with a roll of recording paper comprising:
    a sensor for detecting a leading end edge of the recording paper as being conveyed through the printer;
    a cutter for cutting off a leading end portion of the recording paper before an image is printed on the recording paper, and for cutting the recording paper into a piece with the image printed thereon; and
    a device for driving a printing head of the printer to print a calibration pattern on said leading end portion after said sensor detects the leading end edge before said cutter cuts off said leading end portion,
    wherein a plurality of said image recording areas are provided on the recording paper in predetermined positions, and the printer further comprises:
        a detection device for detecting the positions of said image recording areas; and
        a device for determining a cutting position of the recording paper by said cutter on the basis of the positions of said image recording areas, wherein said cutting position determining device determines a first preliminary cutting position for cutting off said leading end portion on the basis of the position of a nearest one of said image recording areas to the leading end edge, and compares a length from the leading end edge to said first preliminary cutting position with a reference value that is defined by a requisite printing area for said calibration pattern, and determines, if said length is less than said reference value, a second preliminary cutting position that is farther from the leading end edge by one image recording area than said first preliminary cutting position, so said cutter cuts said leading end portion at said second preliminary cutting position.

* * * * *

UNITED STATES PATENT AND TRADEMARK OFFICE
CERTIFICATE OF CORRECTION

PATENT NO. : 6,624,876 B2
DATED : September 23, 2003
INVENTOR(S) : Fukuda et al.

It is certified that error appears in the above-identified patent and that said Letters Patent is hereby corrected as shown below:

<u>Title page,</u>
Item [*] Notice, delete "by 0 days" and insert -- by 31 days --.

Signed and Sealed this

Twenty-fifth Day of April, 2006

JON W. DUDAS
*Director of the United States Patent and Trademark Office*